(No Model.) 2 Sheets—Sheet 1.
A. STEVENS.
MOWING MACHINE.
No. 532,430. Patented Jan. 8, 1895.
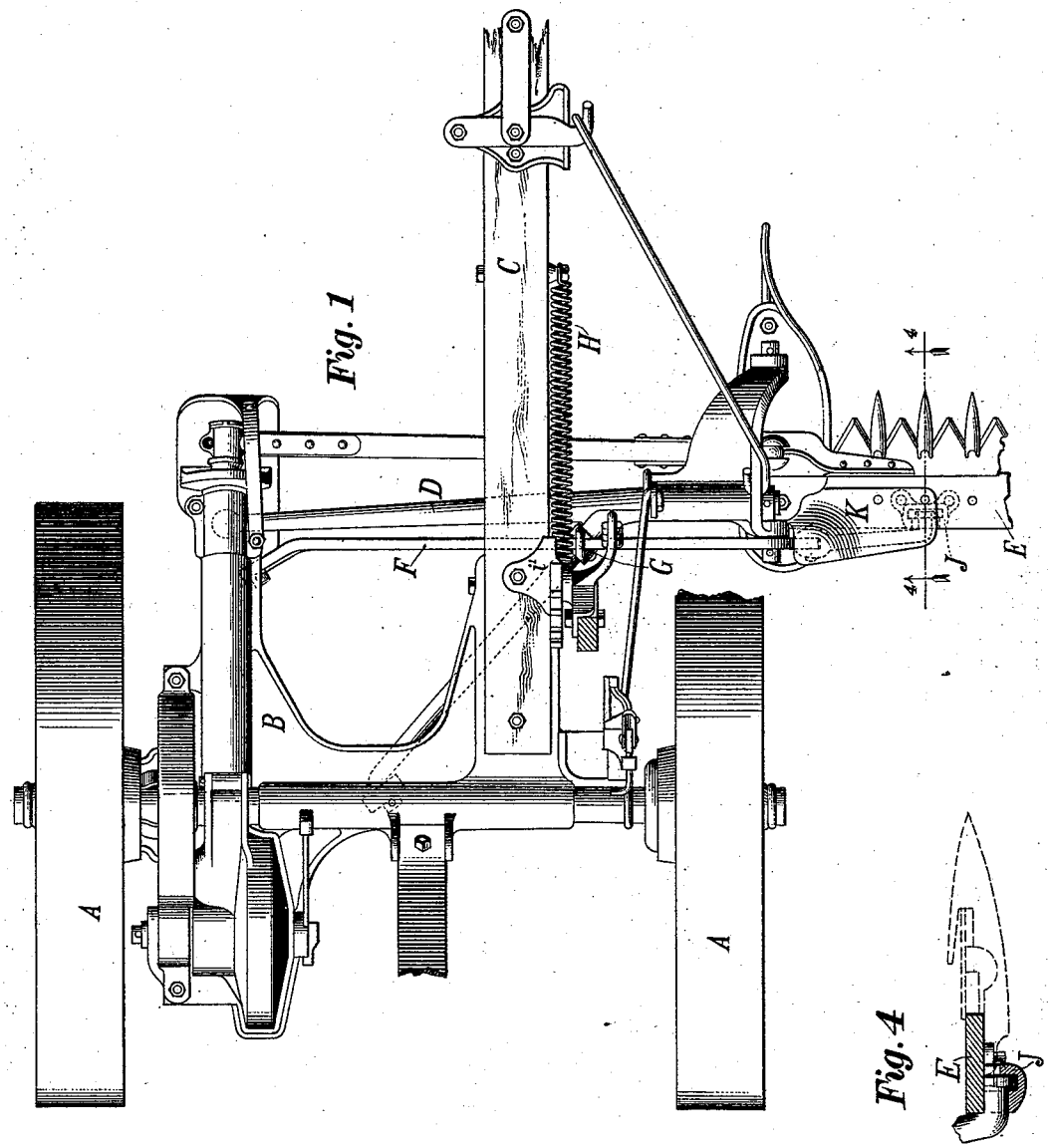
Witnesses
John M. Culver.
Wm H Ferguson
Inventor
Ansel Stevens
By his Attorney R. B. Swift.

(No Model.) 2 Sheets—Sheet 2.
A. STEVENS.
MOWING MACHINE.
No. 532,430. Patented Jan. 8, 1895.
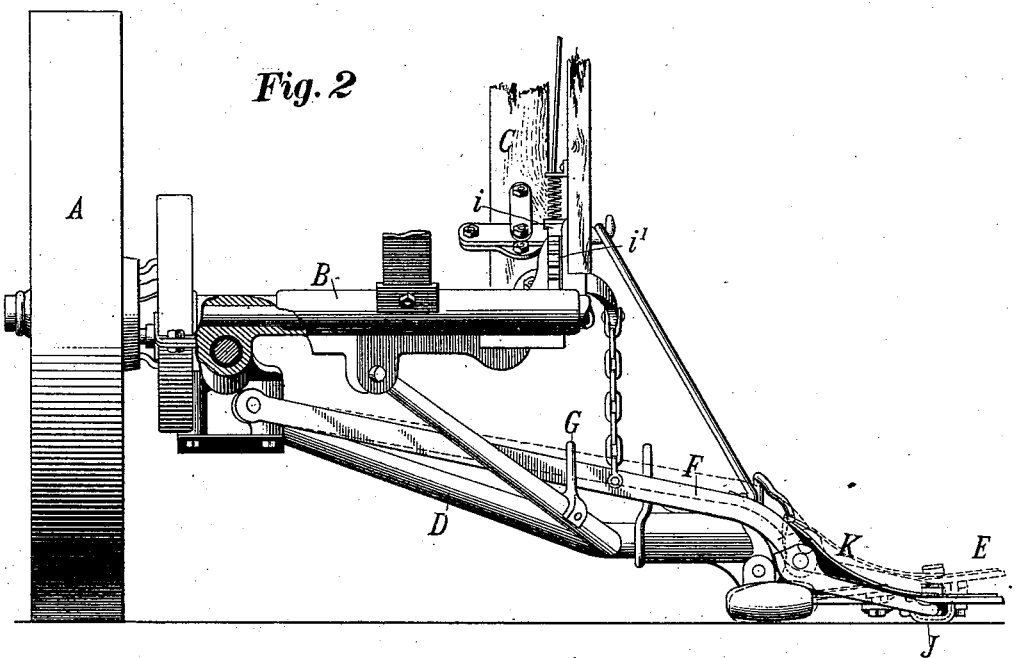
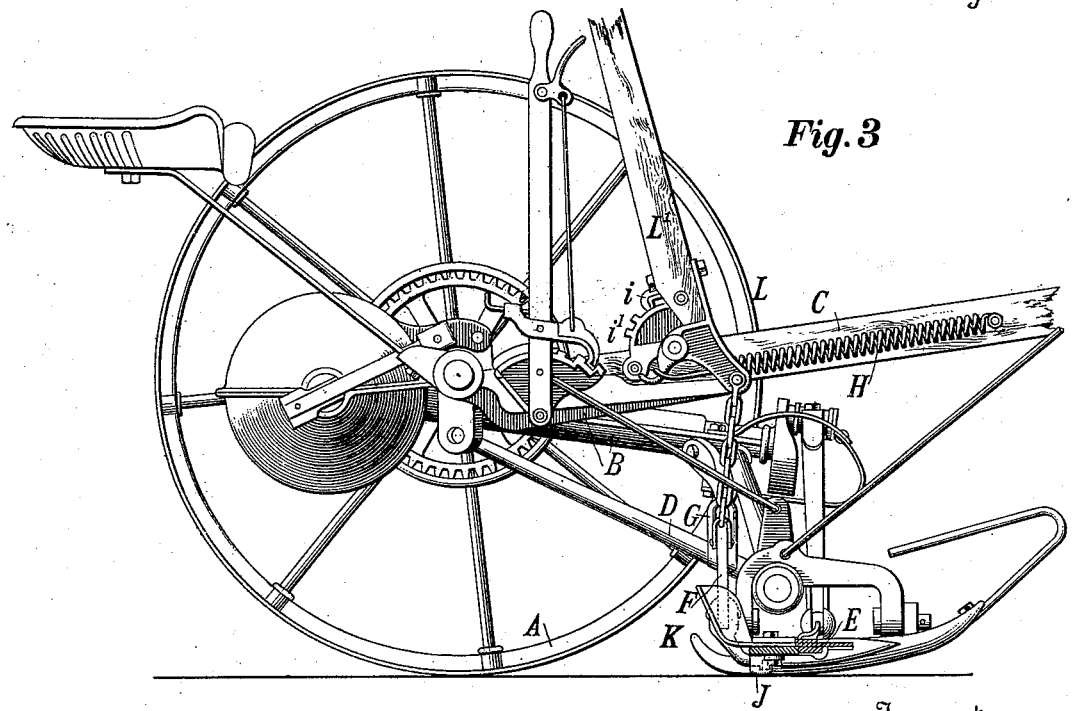
Witnesses
John M Culver
Wm H Ferguson
Inventor
Ansel Stevens
By his Attorney R. B. Swift.
THE NORRIS PETERS CO., PHOTO-LITHO., WASHINGTON, D. C.

UNITED STATES PATENT OFFICE.

ANSEL STEVENS, OF GORHAM, MAINE.

MOWING-MACHINE.

SPECIFICATION forming part of Letters Patent No. 532,430, dated January 8, 1895.

Application filed December 10, 1892. Serial No. 454,733. (No model.)

*To all whom it may concern:*

Be it known that I, ANSEL STEVENS, a citizen of the United States, residing at Gorham, in the county of Cumberland and State of Maine, have invented a new and useful Improvement in Mowing-Machines, of which the following is a specification.

In nearly all the mowers now made, means are provided for carrying part of the weight of the coupling connection and finger bar upon the wheels, thus making the bar rest lightly on the ground and relieving the mower from side draft, while making it more easily drawn and giving it greater capacity to conform to the uneven surface of the ground. This carrying a part of the weight on the frame of the machine is especially desirable in mowers having a long finger-bar that extends from the side of the machine. The means commonly employed for carrying the whole length of the finger-bar have been strong springs attached to levers that have been pivoted upon the coupling connection in such a way as to rest upon an extension from finger bar or springs attached to posts upstanding from shoe, so that when the stress of the springs was exerted, the outer end of the finger bar would be partly supported. A bad fault has attended the use of such devices and the correction of this fault has been attempted in various ways. The fault is that when the outer end of the bar is lifted from the inner end, the bar will spring and thus bend, and the knife reciprocating through fixed ways on the bar, will be bound and its movement attended with great friction. To remedy this fault, the bars have been sprung downward to an extent, as near as the makers could guess at it, that the bar would be liable to spring upward when supported by the spring. The stress of the spring being variable and the surface of the ground frequently rough, and its outer end suddenly raised, the bar will return to its normal curved shape, and the knife be pinched. The bar has been bent, supporting ribs have been fastened to it, trussed rods have been attached, and various other means employed that have been more or less successful, but all costly and inexpedient.

My improvement relates to a means of lifting the finger-bar throughout its length and while so lifting it, to spring it as little as possible. I attain these objects by the mechanism illustrated in the accompanying drawings, in which—

Figure 1 is the top of the frame of a mowing machine with my invention attached. Fig. 2 is a rear view with one of the wheels and part of the main frame removed. Fig. 3 is a side view from the grass side with one of the main wheels removed, and Fig. 4 is a view showing section of the cutter bar with means for holding the lever thereon.

Similar letters refer to similar parts throughout the several views.

The wheels, A, the frame, B, the tongue, C, the coupling frame, D, and the cutter bar, E, are parts of a mowing machine of any of the ordinary types.

Pivoted to the frame, B, is a lever arm, F, that extends outwardly on the finger-bar and its outer end is attached thereto in such way that if any lifting force is applied to the lever arm, F, between its fulcrum, or point of its attachment to the frame, and the point of its bearing upon the finger-bar, it will tend to lift the finger-bar throughout its entire length. Whether the precise point of attaching the lever arm, F, to the main frame, or, in fact, whether it shall be attached to the main frame or the coupling frame, D, and the extent to which it shall be continued outwardly on the finger-bar, are determined by the length of the finger-bar, the amount of weight of the outer end that is desired to be carried upon the wheels, the weight of the coupling arm, and the construction of the machine itself, the essential feature being, that the lever arm, F, shall be pivoted in such a place on the coupling frame and extended outwardly to such a distance on the finger-bar, that the parts shall be properly balanced and the desired amount of weight of the bar be lifted. As it is desired usually to lift the outer end of the bar above the inner end and to a somewhat greater height in passing obstructions, it is necessary to continue the lever arm, F, outwardly upon the bar a distance slightly greater than would be required to balance the coupling frame and finger bar together, and to determine the height to which the outer end of the bar shall be raised above the inner end, a stop, G, is located on the coupling frame, against which the arm, F, is brought when the operator is lifting the coupling frame and finger-bar, and then the parts are raised together. If the lever arm, F, was rigid, the objects so far explained would be attained, but when the cutter bar, E, was turned up vertically for travel on the road or passing obstructions, the lever arm, F, would project from the side of the machine and be liable to strike obstructions and be torn therefrom. To avoid this difficulty, I have put a one-way joint in the lever arm, F, near the joint of the coupling frame to the finger bar, so that, when the finger-bar is turned up vertically, the outer end of the lever arm, F, will fold with it.

Upon the frame, B, or tongue, C, any of the many well known forms of springs or weighted lifting devices can be attached and connected with the lever arm, F. I have shown, to illustrate one form, a helical spring, H, attached to the tongue and extending along to a lifting lever, that is pivoted upon the tongue, one arm of which is connected with the lever arm, F. The spring, H, is attached in such a manner as to exert a constant lifting force that tends to float the coupling frame and finger-bar lightly along the ground. The lifting lever handle, L′, is convenient to the driver's reach, and the dog, i, and the ratchet plate i′, are arranged so that a reasonable vibration of the lever can occur while the bar is passing over rough ground and the spring continue to exert its force while, if the coupling frame and finger bar are lifted to a greater height by the hand lever, the notches on the ratchet plate, i′, will hold the parts in the lifted position.

It is quite evident that the lever, F, would act as a gag lever to raise the outer end of the finger-bar if it was acted on only by the lifting lever unassisted by a spring and the bar would be sprung to a much less extent than by the use of a gag lever of the common types. The outer end of the lever, F, is attached to the finger-bar by a slotted cap, J, that allows the lever to slip back and forth on the bar when the parts are raised and lowered. A shield, K, protects the lever from the cut grass and prevents the grass from catching and being dragged.

Having now described my invention, what I claim is—

1. In a mowing machine, in combination, a coupling connection hinged to the machine frame, a finger-bar hinged to the coupling-frame, a lever attached at one end to the finger-bar, and extending inwardly along the finger-bar and coupling connection, in practically the same plane as these parts and attached to the machine and a lifting device mounted on the machine and exerting its force through the lever to counterbalance the finger-bar and coupling-connection, substantially as and for the purpose described.

2. In combination, in a mowing machine having a jointed finger-bar and coupling connection, a lever one arm of which extends outwardly along the finger-bar from its joint with the coupling connection in practically the same plane as the finger-bar, a pivot on the machine for the said lever, a lifting device on the machine frame attached to the lever, the lever being provided with a joint at a point in its length near the connection of the finger-bar with the coupling-frame, substantially as and for the purpose described.

3. In a mowing machine, in combination with a coupling-frame and hinged finger-bar, a lever, one arm of which extends outwardly along the finger-bar and the other arm of which is pivoted to the machine, a hand-lever on the machine frame, one arm of which is attached to the said lever, a spring on the frame connected to said lever and by its action tending to lighten the weight of the finger-bar and coupling-frame upon the ground and a stop located on the coupling-frame to limit the movement of the said lever to and from the coupling-frame, substantially as and for the purpose specified.

4. In a mowing machine, the combination with a finger-bar pivoted to a coupling-frame, a lever attached to the finger-bar outside of its pivot point and extending inwardly and connected with the machine frame, a spring lifting device mounted on the machine frame and connecting with the lever, substantially as and for the purpose specified.

5. In a mowing machine, the combination with a finger-bar pivoted to a coupling-frame, of a jointed lever connected with the finger-bar outside of the pivot, which connects the finger-bar to the coupling-frame and with the machine inside of this pivot, a stop on the coupling-frame that limits the movement of the lever from coupling-frame, and a lifting mechanism on the machine frame connected with the lever, substantially as and for the purpose specified.

ANSEL STEVENS.

Witnesses:
LEWIS R. JOHNSON,
JOHN A. WATERMAN.